United States Patent
Moon

(10) Patent No.: US 11,225,252 B2
(45) Date of Patent: Jan. 18, 2022

(54) DEVICE AND METHOD FOR CONTROLLING DRIVING OF VEHICLE

(71) Applicants: HYUNDAI MOTOR COMPANY, Seoul (KR); KIA MOTORS CORPORATION, Seoul (KR)

(72) Inventor: Byung Soo Moon, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 292 days.

(21) Appl. No.: 16/456,400

(22) Filed: Jun. 28, 2019

(65) Prior Publication Data

US 2020/0238989 A1    Jul. 30, 2020

(30) Foreign Application Priority Data

Jan. 30, 2019 (KR) .................. 10-2019-0011798

(51) Int. Cl.
- *B60W 30/18* (2012.01)
- *B60W 10/06* (2006.01)
- *F02D 41/22* (2006.01)
- *F02D 41/26* (2006.01)

(52) U.S. Cl.
CPC ........... *B60W 30/18* (2013.01); *B60W 10/06* (2013.01); *F02D 41/22* (2013.01); *F02D 41/263* (2013.01); *B60W 2540/10* (2013.01); *B60W 2540/30* (2013.01); *B60W 2552/15* (2020.02); *B60W 2710/06* (2013.01); *B60W 2710/0627* (2013.01); *B60W 2720/106* (2013.01)

(58) Field of Classification Search
CPC ...................................... B60W 30/18
See application file for complete search history.

(56) References Cited

U.S. PATENT DOCUMENTS

| | | | |
|---|---|---|---|
| 9,745,912 B2* | 8/2017 | Van den Bergh | ... F02D 41/0002 |
| 10,144,290 B2* | 12/2018 | Jang | ...... B60W 10/18 |
| 2019/0185015 A1* | 6/2019 | Kim | ...... B60W 30/182 |
| 2020/0238989 A1* | 7/2020 | Moon | ...... B60W 10/06 |

* cited by examiner

*Primary Examiner* — Michael A Berns
(74) *Attorney, Agent, or Firm* — Lempia Summerfield Katz LLC

(57) ABSTRACT

A device for controlling driving of a vehicle includes: a detector to acquire driving information, driver information, and surrounding environment information about the vehicle, and a controller to determine whether to activate a safety driving mode based on at least one of the driving information, driver information, and surrounding environment information about the vehicle, and to determine whether to maintain the safety driving mode state based on a vehicle state after the activation of the safety driving mode. Thus, the device may support a safety driving of the vehicle by restricting a speed of the vehicle even when the driver incorrectly operates an accelerator pedal in place of a brake pedal of the vehicle.

18 Claims, 10 Drawing Sheets

DEVICE AND METHOD FOR CONTROLLING DRIVING OF VEHICLE

CROSS-REFERENCE TO RELATED APPLICATION

This application claims priority to and the benefit of Korean Patent Application No. 10-2019-0011798, filed on Jan. 30, 2019, the entire contents of which are incorporated herein by reference.

FIELD

The present disclosure relates to a device and a method for controlling driving of a vehicle.

BACKGROUND

The statements in this section merely provide background information related to the present disclosure and may not constitute prior art.

Generally, a non-skillful driver often operates by mistake an accelerator pedal in place of a brake pedal or vice versa when driving immediately after starting a vehicle; when entering a parking lot or departing from the parking lot; when driving along an alley; when repeating "stop and go" operations due to a traffic jam in downtowns; and when moving suddenly from a dark area to a bright area, and the like.

In such situations, when the non-skillful driver incorrectly operates the accelerator pedal in place of the brake pedal, accidents may occur.

SUMMARY

The present disclosure has been made to solve the above-mentioned problems occurring in the prior art while advantages achieved by the prior art are maintained intact.

An aspect of the present disclosure provides a device and a method for controlling driving of a vehicle that may reduce or prevent accidents even when a driver incorrectly operates the accelerator pedal in place of the brake pedal.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling driving of a vehicle includes: a detector configured to acquire driving information, driver information, and surrounding environment information about the vehicle, and a controller configured to determine whether to activate a safety driving mode based on at least one of the driving information, the driver information, or the surrounding environment information about the vehicle, and to determine whether to maintain the safety driving mode based on a state of the vehicle after activating the safety driving mode.

According to an aspect of the present disclosure, the controller determines whether the vehicle is in a rapid acceleration state based on a sensed value from an accelerator pedal sensor associated with a gradient of a road on which the vehicle travels.

According to an aspect of the present disclosure, when the sensed value is indicative of a downward gradient and equal to or greater than a first reference value, the controller determines that the vehicle is in the rapid acceleration state.

According to an aspect of the present disclosure, when the sensed value is indicative of a downward gradient, a flat gradient, or an upward gradient and is equal to or greater than a second reference value higher than the first reference value, the controller determines that the vehicle is in the rapid acceleration state.

According to an aspect of the present disclosure, when the sensed value is indicative of an upward gradient and equal to or greater than a third reference value, the controller determines that the vehicle is in the rapid acceleration state.

According to an aspect of the present disclosure, when the state of the vehicle is determined as the rapid acceleration state, the controller maintains the safety driving mode, and adapts a speed of the vehicle to a speed corresponding to the safety driving mode.

According to an aspect of the present disclosure, the safety driving mode includes a driving mode in which, when the vehicle is determined to be in the rapid acceleration state while being in a parked state or a stopped state, a gear level of the vehicle is set to a lowest level and a revolutions per minute (RPM) of an engine of the vehicle is maintained to be equal to or lower than a reference revolutions per minute (RPM).

According to an aspect of the present disclosure, the safety driving mode includes a driving mode in which, when the vehicle is determined to be in the rapid acceleration state while being in a driving state, a gear level of the vehicle is set to a gear level corresponding to the driving state, and a fuel supply to an engine of the vehicle is cut.

According to an aspect of the present disclosure, the controller determines a safety driving mode subject or a safety driving mode area based on at least one of the driving information, the driver information, or the surrounding environment information about the vehicle. Further, the controller determines whether to activate the safety driving mode based on whether a driver of the vehicle is the safety driving mode subject or whether a current location of the vehicle is in the safety driving mode area.

According to an aspect of the present disclosure, when the driver is not the safety driving mode subject, or when the current location of the vehicle is not in the safety driving mode area, the controller adapts the vehicle speed to a speed corresponding to a normal driving mode.

According to an aspect of the present disclosure, a method for controlling driving of a vehicle includes: acquiring, by a detector, driving information, driver information, and surrounding environment information about the vehicle; determining, by a controller, whether to activate a safety driving mode based on at least one of the driving information, the driver information, or the surrounding environment information about the vehicle; and determining, by the controller, whether to maintain the safety driving mode based on a state of the vehicle after activating the safety driving mode.

According to an aspect of the present disclosure, the method further includes determining, by the controller, whether the vehicle is in a rapid acceleration state based on a sensed value from an accelerator pedal sensor associated with a gradient of a road on which the vehicle is traveling.

According to an aspect of the present disclosure, the method further includes determining, by the controller, that the vehicle is in the rapid acceleration state when the road has a downward gradient and the sensed value from the accelerator pedal sensor is equal to or greater than a first reference value.

According to an aspect of the present disclosure, the method further includes determining by the controller that the vehicle is in the rapid acceleration state when the road has a downward gradient, a flat gradient, or an upward gradient and the sensed value from the accelerator pedal sensor is equal to or greater than a second reference value higher than the first reference value.

According to an aspect of the present disclosure, the method further includes determining by the controller that the vehicle is in the rapid acceleration state when the road has an upward gradient and the sensed value from the accelerator pedal sensor is equal to or greater than a third reference value.

According to an aspect of the present disclosure, the method further includes maintaining, by the controller, the safety driving mode and adapting a speed of the vehicle to a speed corresponding to the safety driving mode when the state of the vehicle is determined to be in the rapid acceleration state.

According to an aspect of the present disclosure, the safety driving mode includes a driving mode in which, when the vehicle is determined to be in the rapid acceleration state while being in a parked or stopped state, a gear level of the vehicle is set to a lowest level and a revolutions per minute (RPM) of an engine of the vehicle is maintained to be equal to or lower than a reference revolutions per minute (RPM).

According to an aspect of the present disclosure, the safety driving mode includes a driving mode in which, when the vehicle is determined to be in the rapid acceleration state while being in a driving state, a gear level of the vehicle is set to a gear level corresponding to the driving state, and a fuel supply to an engine of the vehicle is cut.

According to an aspect of the present disclosure, the method further includes determining, by the controller, a safety driving mode subject or a safety driving mode area based on at least one of the driving information, the driver information, and the surrounding environment information about the vehicle, and determining, by the controller, whether to activate the safety driving mode based on whether the driver of the vehicle is the safety driving mode subject or whether a current location of the vehicle is in the safety driving mode area.

According to an aspect of the present disclosure, the method further includes adapting, by the controller, the speed of the vehicle to a speed corresponding to a normal driving mode when the driver is not the safety driving mode subject, or when the current location of the vehicle is not in the safety driving mode area.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
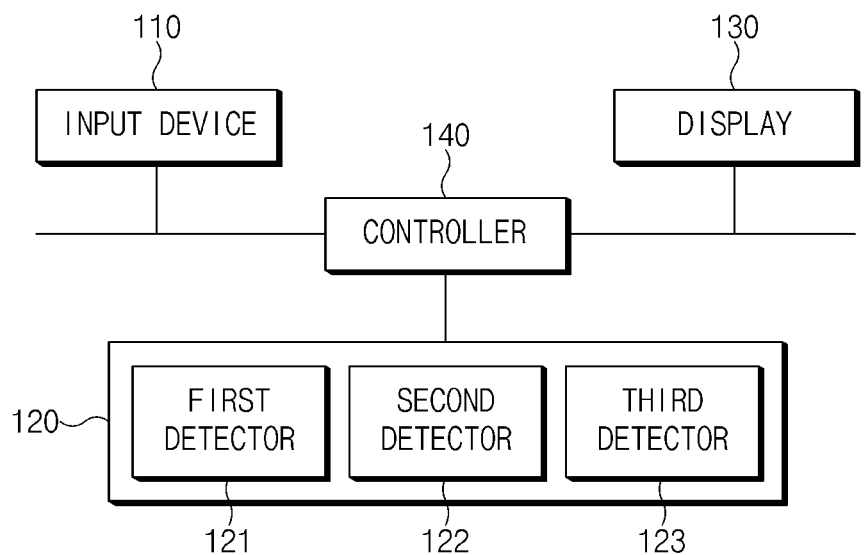
FIG. 1 is a block diagram of a device for controlling driving of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In adding the reference numerals to the components of each drawing, it should be noted that the identical or equivalent component is designated by the identical numeral even when they are displayed on other drawings. Further, in describing the form of the present disclosure, a detailed description of well-known features or functions will be ruled out in order not to unnecessarily obscure the gist of the present disclosure.

In describing the components of the form according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram of a device for controlling driving of a vehicle according to an exemplary form of the present disclosure.

As shown in FIG. 1, a device for controlling driving of a vehicle includes an input device 110, a detector 120, a display 130, and a controller 140.

The input device 110 may output an input signal, which is an electrical signal corresponding to a manipulation of a driver.

The input device 110 may output an input signal to deactivate a safety driving mode corresponding to a manipulation of the driver.

The input device 110 may be implemented as at least one of a scroll wheel, a button, a knob, a touch screen, a touch pad, a lever, a track ball, an operation sensor and a voice recognition sensor, or a combination thereof, and may be provided on a dashboard.

The detector 120 may include a first detector 121, a second detector 122, and a third detector 123. For example, the first detector 121 may acquire driving information of the vehicle, the second detector 122 may acquire driver information, and the third detector 123 may acquire surrounding environment information about the vehicle.

The first detector 121 may acquire an engine RPM sensed by an engine RPM sensor, a speed of the vehicle sensed by a vehicle speed sensor, speed change information of the vehicle sensed by a transmission lever sensor, and sensed values sensed by a brake pedal sensor and an accelerator pedal sensor. In this connection, the sensed value from the accelerator pedal sensor may refer to a measure of a degree to which the driver presses the accelerator pedal.

The second detector 122 may acquire driver personal information pre-stored in a Driver State Warning (DSW) device and looking ahead information of the driver sensed from the DSW device. In this connection, the driver personal information may include a gender, an age, a driving experience, a vehicle driving time of the driver.

Further, the second detector 122 may acquire information on whether the driver wears a seat belt sensed by a seat belt sensor, a steering angle of a steering wheel sensed by a steering angle sensor, and information on whether a driver's hand grips the steering wheel from a pressure sensor provided on the steering wheel.

The third detector 123 may acquire a current location of the vehicle from a navigation, the vehicle surrounding information from a camera provided in a front or rear of the vehicle, and a gradient of a road sensed by a gradient sensor.

When the controller 140 determines a safety driving mode subject or a safety driving mode area, the display 130 may be controlled to display the same.

The display 130 may be provided on the dashboard of the vehicle, and may be provided on in an AVN or a cluster, as an example.

The display 130 may be implemented as an LCD (Liquid Crystal Display), an LED (Light Emitting Diode), a PDP (Plasma Display Panel), an AMOLED (Active Matrix Organic Light Emitting Diode), a POLED (Plastic Organic Light Emitting Diode), and the like, but is not limited thereto. The display 130 may be implemented as a touch screen type, in which case a function of the input device may also be performed.

The controller 140 may control an overall operation of the device for controlling driving of the vehicle according to the present disclosure.

The controller 140 may determine the safety driving mode subject and the safety driving mode area based on at least one of the driving information, driver information, or surrounding environment information about the vehicle, and may adapt the vehicle speed to a speed corresponding to the safety driving mode or a normal driving mode.

According to an exemplary form of the present disclosure, the safety driving mode may refer to a driving mode in which, when the vehicle changes from the stopped or parked state to the acceleration state (rapid acceleration state), a gear level is set to a lowest level and the engine RPM is maintained to be equal to or lower than a reference RPM.

Further, the safety driving mode may refer to a driving mode in which, when the vehicle is determined to be in the acceleration state (rapid acceleration state) while being in a driving state, the gear level is set to a gear level corresponding to the driving state, and a supply of fuel to an engine is cut (or blocked).

Further, the normal driving mode may refer to a driving mode in which the gear level is set based on a manipulation of the driver.

The controller 140 may determine the safety driving mode subject based on at least one of the driving information, driver information, or surrounding environment information about the vehicle acquired from the detector 120.

More specifically, the controller 140 may authenticate a passenger seated on a driver's seat as the driver based on the driver personal information stored in the driver state warning device.

When the driver is authenticated, the controller 140 determines whether the authenticated driver is the safety driving mode subject.

The controller 140 first determines whether the driver is male. Then, when the driver is male, the controller 140 determines whether the driver belongs to a first reference age group. According to another form, the first reference age group may include the age group (under the age of 25 or over the age of 60) in which driving is determined non-skillful. In one form, the controller 140 may determine a male driver under the age of 25 or over the age of 60 as a non-skillful driver.

When the driver is male and the driver does not belong to the first reference age group, the controller 140 determines whether a driving experience is greater than a reference experience period.

When the driving experience period of the driver is determined to be greater than the reference experience period, the controller 140 determines whether a driving time of the driver is greater than a reference driving time. Meanwhile, when the driving experience period thereof is smaller than the reference experience period, the controller 140 determines the driver as the safety driving mode subject.

When the vehicle driving time is determined to be greater than the reference driving time, the controller 140 determines the driver as a normal driving mode subject not the safety driving mode subject. Meanwhile, when the driving time thereof is smaller than the reference driving time, the controller 140 determines the driver as the safety driving mode subject.

Further, when the driver is not male, that is, the driver is female, the controller 140 determines whether the driver belongs to a second reference age group. According to another form, the second reference age group include the age group (under the age of 25 or over the age of 50) in which driving is determined non-skillful. According to other form, the controller 140 may determine a female driver under the age of 25 or over the age of 50 as a non-skillful driver.

When the driver is female and the driver does not belongs to the second reference age group, the controller 140 determines whether a driving experience is greater than a reference experience period, when the driving experience period of the driver is determined to be greater than the reference experience period, the controller 140 determines whether a driving time of the driver is greater than a reference driving time. When the vehicle driving time is determined to be greater than the reference driving time, the controller 140 determines the driver as a normal driving mode subject not the safety driving mode subject. Meanwhile, when the driving experience period thereof is smaller than the reference experience period, or the driving time thereof is smaller than the reference driving time, the controller 140 may determine the driver as the safety driving mode subject.

When the driver is male who belongs to the first reference age group, and when the driver is female who belongs to the second reference age group the controller 140 may determine the driver as the safety driving mode subject.

When the driver is determined to be the safety driving mode subject, the controller 140 may activate the safety driving mode. Further, when the driver is not determined to be the safety driving mode subject, the controller 140 may activate the normal driving mode.

The controller 140 may determine the safety driving mode area based on at least one of the driving information, driver information, or surrounding environment information about the vehicle acquired from the detector 120.

According to another form, when it is determined that the vehicle is located in a building or at a parking lot based on the vehicle surrounding environment information about the vehicle acquired from the detector 120, the controller 140 may determine that the vehicle is located in the safety driving mode area.

Further, when at least one of a children protection zone, a senior protection zone, or a speed-bump zone is located in a predetermined range around the vehicle based on the vehicle surrounding environment information, the controller 140 may determine that the vehicle is located in the safety driving mode area.

Further, when the vehicle is located on a two lane road except for an expressway, a local road, and a driveway based on the vehicle surrounding environment information about the vehicle, the controller 140 may determine that the vehicle is located in the safety driving mode area.

When the vehicle is located in an expressway service area, a rest area, a road without lane/signal information, a residential area road, the controller 140 may determine that the vehicle is located in the safety driving mode area.

When it is determined that the vehicle is located in the safety driving mode area, the controller 140 may activate the safety driving mode. Further, when it is determined that the vehicle is not located in the safety driving mode area, the controller 140 may activate the normal driving mode.

When it is determined that the vehicle is not located in the safety driving mode area, the controller 140 determines whether a vehicle in front of or rear the vehicle is in a congested state.

When it is determined that a vehicle in front of or rear the vehicle is in the congested state, the controller 140 may activate the safety driving mode.

When the vehicle is not located in the safety driving mode area, and a vehicle in front of or rear the vehicle is not in the congested state, the controller 140 may activate the normal driving mode.

The controller 140 may determine whether to maintain the safety driving mode based on a result of the determination of the state of the vehicle.

In this connection, when the vehicle is determined to be in the acceleration state, the controller 140 may maintain the safety driving mode, and adapt the vehicle speed to a speed corresponding to the safety driving mode. Further, when the vehicle is determined not to be in the acceleration state, the controller 140 may deactivate the safety driving mode, and adapt the vehicle speed to a speed corresponding to the normal driving mode.

The controller 140 may determine the state of the vehicle based on whether the vehicle is in the stopped or parked state, or in the driving state.

First, an operation, by the controller 140, for determining the state of the vehicle while the vehicle is in the stopped or parked state will be described.

When the transmission lever of the vehicle is 'P' or 'N', and the vehicle speed is '0', the controller 140 may determine that the vehicle is in the stopped or parked state.

Upon determining whether the driver is the safety driving mode subject while the vehicle is in the stopped or parked state, and determining the driver as the safety driving mode subject, the controller 140 may determine whether the safety driving mode is deactivated based on the input signal output from the input device 110.

When the safety driving mode is not deactivated, the controller 140 may determine whether the transmission lever of the vehicle has been changed to 'D' or 'R'.

When the transmission lever of the vehicle is changed to 'D' or 'R', the controller 140 may reactivate the safety driving mode. Further, the controller 140 may determine the state of the vehicle after the reactivation of the safety driving mode.

In this connection, the state of the vehicle may be determined based on the sensed value from the accelerator pedal sensor (APS) associated with the road gradient acquired from the detector 120. In addition, whether the vehicle is in the acceleration state may be determined based on the sensed value from the accelerator pedal sensor associated with the road gradient.

Further, the state of the vehicle may be determined based on the engine RPM associated with the pressed degree of the accelerator pedal. Further, whether the vehicle is in the acceleration state may be determined based on the engine RPM.

In this connection, as used herein, the acceleration state may refer to an abnormal accelerator pedal pressed state at a certain road gradient rather than a normal acceleration state due to driving of non-skillful driver. Thus, the acceleration state may refer to rapid acceleration state.

According to an exemplary form of the present disclosure, the road gradient may include a road gradient less than −5%, a road gradient of −5% to 5%, and a road gradient greater than 5%.

In one example, the road gradient less than −5% may refer to a downhill road as a road having a downward gradient. In addition, the road gradient of −5% to 5% may refer to a downhill road, a flat road, and an uphill road respectively having a downward gradient, horizontal gradient, and an upward gradient. Further, the road gradient greater than 5% may refer to an uphill road as a road having an upward gradient.

When the sensed value from the accelerator pedal sensor on the road having the downward gradient (downhill road) is equal to or greater than the first reference value, the controller 140 may determine that the vehicle is in the acceleration state (rapid acceleration state).

Further, when the sensed value from the accelerator pedal sensor on a road having one of the downward (downhill), the flat, and the upward (uphill) gradients is equal to or greater than the second reference value that is higher than the first reference value, the controller 140 may determine that the vehicle is in the acceleration state (rapid acceleration state).

Further, when the sensed value from the accelerator pedal on the road having the upward gradient (uphill road) is equal to or greater than the third reference value that is higher than the second reference value, the controller 140 may determine that the vehicle is in the acceleration state (rapid acceleration state).

Further, when an actual engine RPM rises abnormally relative to a normal engine RPM based on a pressed degree of the accelerator pedal, the controller 140 determines that the vehicle is in the acceleration state (rapid acceleration state).

When it is determined that the vehicle changes from the stopped or parked state to the acceleration state (rapid acceleration state), the controller 140 may maintain the safety driving mode, and adapt the vehicle speed to the speed corresponding to the safety driving mode.

When the transmission lever is changed from 'P' or 'N' to 'D' or 'R', in setting the speed corresponding to the safety driving mode, the controller 140 may set the gear level to the lowest level (e.g.: gear level 1), and control the engine RPM to maintain equal to or lower than the reference RPM. Further, the controller 140 may control the display 130 to display that the vehicle speed is being adapted to the speed corresponding to the safety driving mode.

Further, when the sensed value from the accelerator pedal sensor on the road having the downward gradient (downhill road) is lower than the first reference value, the controller 140 may determine that the vehicle is not in the acceleration state (rapid acceleration state).

Further, when the sensed value from the accelerator pedal sensor on the road having one of the downward (downhill), the flat, and the upward (uphill) gradients is lower than the second reference value that is higher than the first reference value, the controller 140 may determine that the vehicle is not in the acceleration state (rapid acceleration state).

Further, when the sensed value from the accelerator pedal on the road having the upward gradient (uphill road) is lower than the third reference value that is higher than the second reference value, the controller 140 may determine that the vehicle is not in the acceleration state (rapid acceleration state).

Further, when the engine RPM rises normally based on the pressed degree of the accelerator pedal, the controller 140 may determine that the vehicle is not in the acceleration state (rapid acceleration state) according to the present disclosure.

When it is determined that the vehicle is not in the acceleration state (rapid acceleration state), the controller 140 may deactivate the safety driving mode, activate the normal driving mode, and adapt the vehicle speed to the speed corresponding to the normal driving mode.

When it is determined that the driver is not the safety driving mode subject, or determining that the safety driving mode is deactivated based on the input signal output from the input device 110, the controller 140 determines whether the seat belt is fastened, whether the steering wheel is gripped, or whether the driver is looking ahead.

When the seat belt is not fastened, when the driver's hand is not gripping the steering wheel, or when the driver is not looking ahead, the controller 140 may reactivate the safety driving mode, and adapt the vehicle speed to the speed corresponding to the safety driving mode.

When the seat belt is fastened, when the driver's hand is gripping the steering wheel, and when the driver is looking ahead, the controller 140 may activate the normal driving mode, and adapt the vehicle speed to the speed corresponding to the normal driving mode.

Hereinafter, an operation, by the controller 140, for determining the state of the vehicle in the driving state of the vehicle will be described in detail.

When the transmission lever of the vehicle is 'D' or 'R', and the vehicle speed is not '0', the controller 140 may determine that the vehicle is driving.

The controller 140 determines whether the safety driving mode is deactivated based on the input signal output from the input device 110 while the vehicle is in the driving state, and determines whether the vehicle is currently located in the safety driving mode area.

When it is determined that the vehicle is located in the safety driving mode area, the controller 140 determines whether the transmission lever of the vehicle is 'D' or 'R'.

When the transmission lever of the vehicle is 'D' or 'R', the controller 140 may reactivate the safety driving mode.

Further, the controller 140 determines the state of the vehicle after the reactivation of the safety driving mode.

When the sensed value from the accelerator pedal sensor on the road having the downward gradient (downhill road) is equal to or greater than the first reference value, the controller 140 may determine that the vehicle is in the acceleration state (rapid acceleration state).

Further, when the sensed value from the accelerator pedal sensor on the road having one of the downward (downhill road), the flat, and the upward (uphill) gradients is equal to or greater than the second reference value that is higher than the first reference value, the controller 140 may determine that the vehicle is in the acceleration state (rapid acceleration state).

Further, when the sensed value from the accelerator pedal sensor on the uphill road is equal to or greater than the third reference value that is higher than the second reference value, the controller 140 may determine that the vehicle is in the acceleration state (rapid acceleration state).

Further, when an actual engine RPM rises abnormally relative to a normal engine RPM based on a pressed degree of the accelerator pedal, the controller 140 determines that the vehicle is in the acceleration state (rapid acceleration state).

When it is determined that the vehicle is in the acceleration state (rapid acceleration state) while being in the driving state, the controller 140 adapts the vehicle speed to the speed corresponding to the safety driving mode.

In adapting the vehicle speed to the speed corresponding to the safety driving mode, when the transmission lever is unchanged and maintains 'D' or 'R', the controller 140 sets the gear level to the gear level of the driving state and blocks the fuel supply to the engine. Further, the controller 140 controls the display 130 to display that the vehicle speed is being adapted to the speed corresponding to the safety driving mode.

Further, when the sensed value from the accelerator pedal sensor on the road having the downward gradient (downhill road) is lower than the first reference value, the controller 140 may determine that the vehicle is not in the acceleration state.

Further, when the sensed value from the accelerator pedal sensor on the road having one of the downward (downhill), the flat, and the upward (uphill) gradients is lower than the second reference value that is higher than the first reference value, the controller 140 may determine that the vehicle is not in the acceleration state (rapid acceleration state).

Further, when the sensed value from the accelerator pedal sensor on the road having the upward gradient is lower than the third reference value that is higher than the second reference value, the controller 140 may determine that the vehicle is not in the acceleration state (rapid acceleration state).

Further, when the engine RPM rises normally based on the pressed degree of the accelerator pedal, the controller 140 may determine that the vehicle is not in the acceleration state (rapid acceleration state) according to the present disclosure.

When it is determined that the vehicle is not in the acceleration state (rapid acceleration state), the controller 140 may deactivate the safety driving mode, activate the normal driving mode, and adapt the vehicle speed to the speed corresponding to the normal driving mode.

When it is determined that the driver is not the safety driving mode subject, or determining that the safety driving mode is deactivated based on the input signal output from the input device 110, the controller 140 determines whether the seat belt is fastened, whether the steering wheel is gripped, or whether the driver is looking ahead.

When the seat belt is not fastened, when the driver's hand is not gripping the steering wheel, or when the driver is not looking ahead, the controller 140 may activate the safety driving mode.

When the seat belt is fastened, when the driver's hand is gripping the steering wheel, and when the driver is looking ahead, the controller 140 may activate the normal driving mode, and adapt the vehicle speed to a speed corresponding to the normal driving mode.

Figure 2:
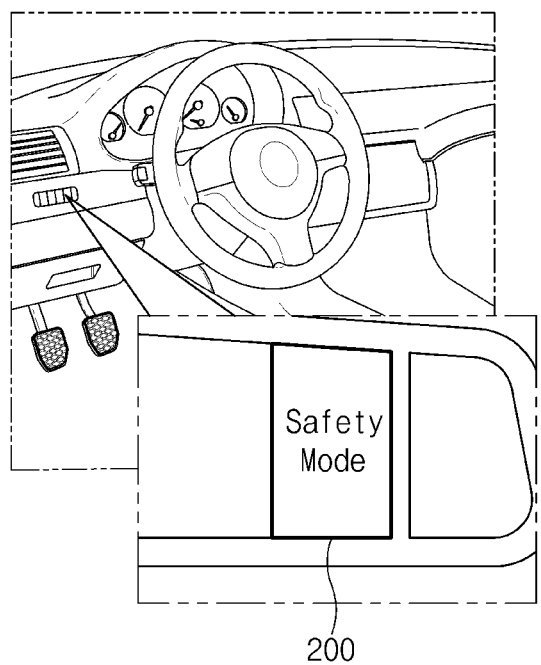
FIG. 2 illustrates an input device.

FIG. 2 illustrates an input device according to an form of the present disclosure.

As shown in FIG. 2, an input device 200 according to an form of the present disclosure may be implemented in a button type, and may be provided on a dashboard on one side of the driver's seat.

Upon pressed by the driver, the input device 200 may output a corresponding input signal to deactivate the safety driving mode.

The input device 200 is not limited to being implemented as the button type as shown in FIG. 2. The input device 200 may be implemented in various forms as described in the description of the input device 110.

Figure 3:
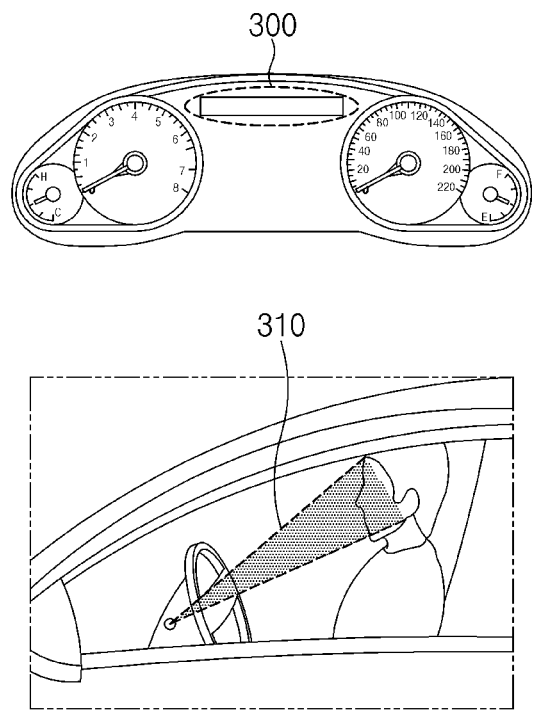
FIG. 3 illustrates a driver state warning device.

FIG. 3 illustrates a driver state warning device according to an exemplary form of the present disclosure.

As shown in FIG. 3, a driver state warning device 300 may be provided in a cluster.

The driver state warning device 300 may include an infrared sensor, an image sensor, and the like. The sensor may sense a driver's face in a predetermined region 310, and monitor a driver's state such as a driver's gaze direction, and the like based on the sensed information.

The driver state warning device 300 may include storage for storing the driver personal information at a beginning of a setting. The driver personal information may include the gender, the age, the driving experience, the vehicle driving time of the driver.

Figure 4:
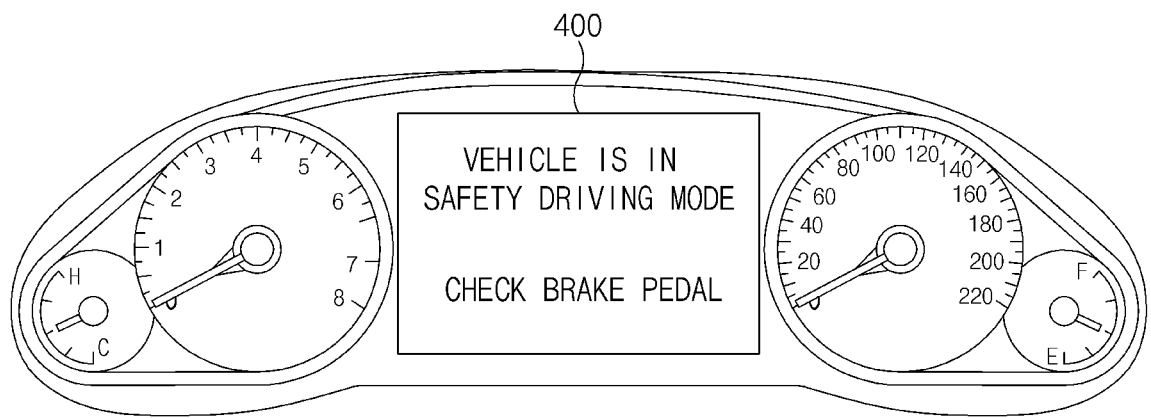
FIG. 4 illustrates an image output in a safety driving mode.

FIG. 4 illustrates an image output in a safety driving mode according to one form of the present disclosure.

As shown in FIG. 4, a display 400 may be provided in a cluster. In addition, when the vehicle speed is adapted to the speed corresponding to the safety driving mode, the display 400 may display a message that the vehicle is currently controlled in the safety driving mode.

Figure 5:
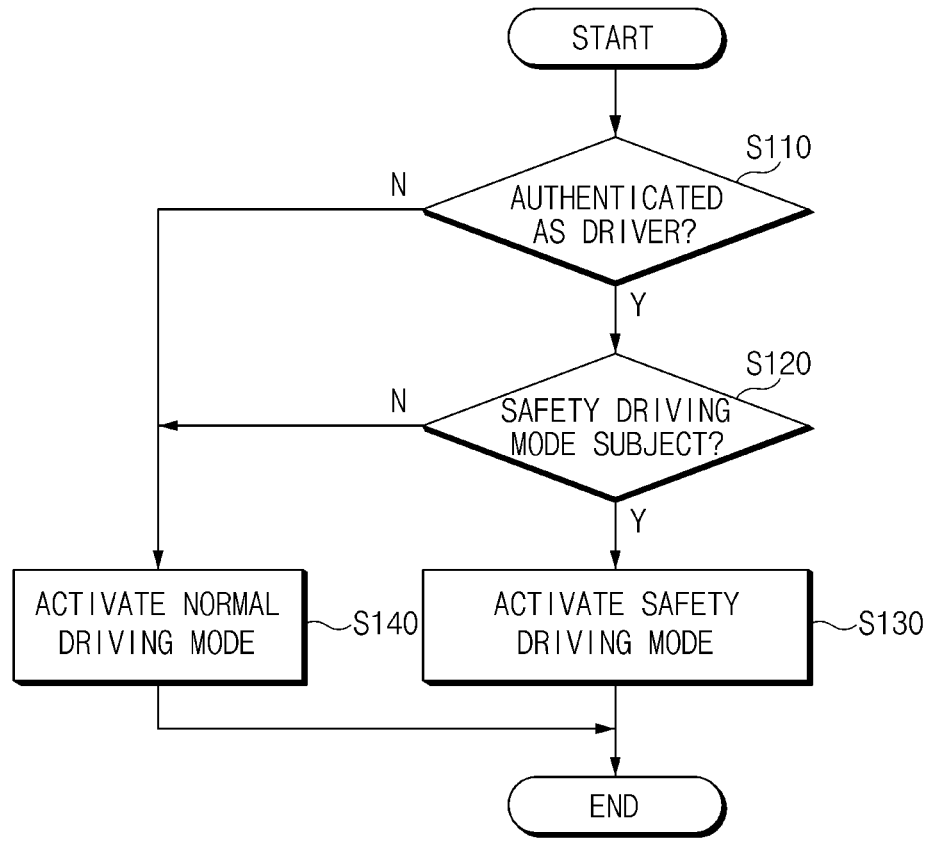
FIG. 5 is a flowchart illustrating a method for determining a driving mode of a vehicle.

FIG. 5 is a flowchart illustrating a method for determining a driving mode of a vehicle according to one form of the present disclosure.

As shown in FIG. 5, the controller 140 determines whether the passenger seated on the driver's seat may be authenticated as the driver based on the driver personal information stored in the driver state warning device (see FIG. 3) (S110).

When the passenger is authenticated as the driver (Y) in S110, the controller 140 determines whether the driver is the safety driving mode subject (S120).

When the driver is determined as the safety driving mode subject in S120, the controller 140 activates the safety driving mode (S130).

When the passenger is not authenticated as the driver (N) in S110, or when the driver is determined not to be the safety driving mode subject, the controller 140 activates the normal driving mode (S140).

Figure 6:
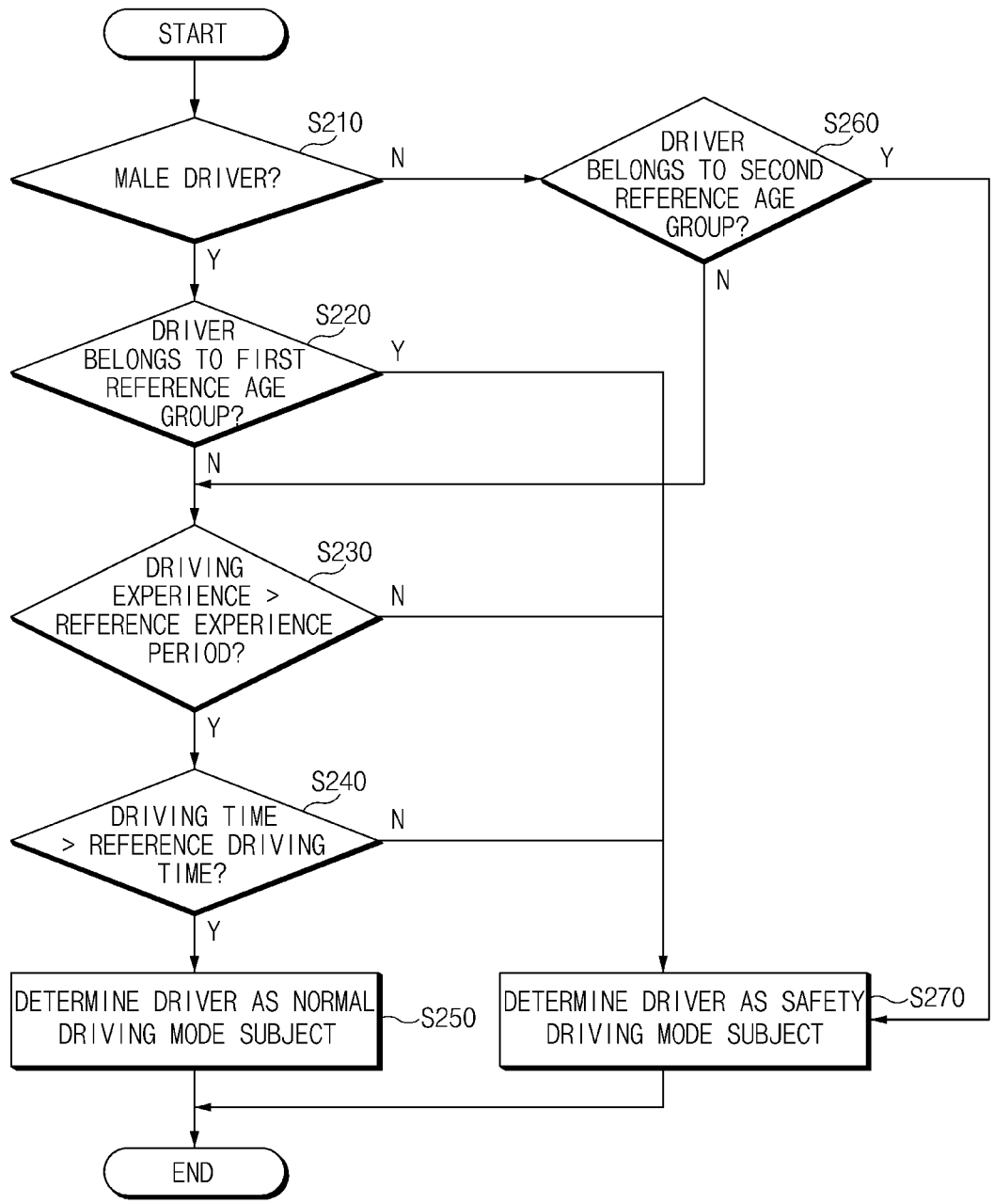
FIG. 6 is a flowchart illustrating a method for determining a safety driving mode subject.

FIG. 6 is a flowchart illustrating a method for determining a safety driving mode subject according to another form of the present disclosure.

As shown in FIG. 6, the controller 140 determines whether the driver is male (S210).

When the driver is determined to be male (Y) in S210, the controller 140 determines whether the driver is male driver and belongs to the first reference age group (S220).

When the male driver does not belong to the first reference age group in S220, the controller 140 determines whether the driving experience is greater than the reference experience period (S230).

When the driving experience of the male driver is determined to be greater than the reference experience period in S230, the controller 140 determines whether the driving time is greater than the reference driving time (S240). When the driving experience of the male driver is determined to be smaller than the reference experience period in S230, the controller 140 determines the driver is the safety driving mode subject (S270).

When the vehicle driving time is determined to be greater than the reference driving time in S240, the controller 140 determines that the driver is the normal driving mode subject not the safety driving mode subject (S250). When the vehicle driving time is determined to be smaller than the reference driving time in S240, the controller 140 determines that the driver is the safety driving mode subject (S270).

Further, when the driver is not male (N) in S210, that is, the driver is female, the controller 140 determines whether the female driver belongs to the second reference age group (S260). When the female driver does not belong to the second reference age group in S260, the controller 140 determines whether the driving experience is greater than the reference experience period (S230). When the driving experience of the female driver is determined to be greater than the reference experience period in S230, the controller 140 determines whether the driving time is greater than the reference driving time (S240). When the driving experience of the female driver is determined to be smaller than the reference experience period in S230, the controller 140 determines the driver is the safety driving mode subject (S270). When the vehicle driving time is determined to be greater than the reference driving time in S240, the controller 140 determines that the driver is the normal driving mode subject not the safety driving mode subject (S250). When the vehicle driving time is determined to be smaller than the reference driving time in S240, the controller 140 determines that the driver is the safety driving mode subject (S270).

The controller 140 may determine, when the driver is male who driver belongs to the first reference age group, when the driver is female who belongs to the second reference age group, the driver as the safety driving mode subject (S270).

When the driver is male and the driver does not belong to the first reference age group, or when the driver is female and is the driver does not belong to the second reference age group, the driving experience thereof is greater than the reference experience period, and the driving time thereof is greater than the reference driving time, the controller 140 determines the driver as the normal driving mode subject not the safety driving mode subject (S250).

Figure 7:
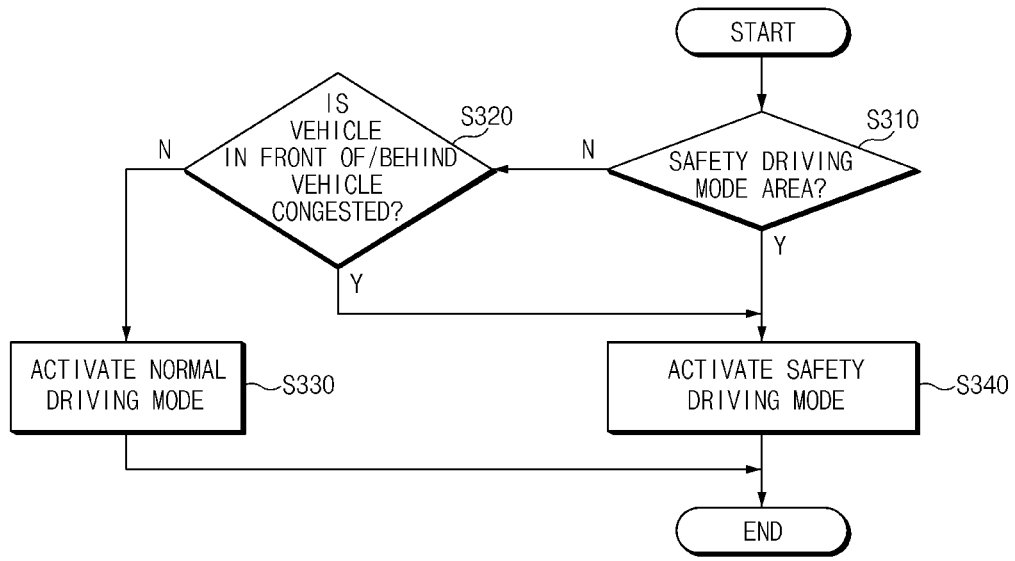
FIG. 7 is a flowchart illustrating a method for determining a driving mode of a vehicle.

FIG. 7 is a flowchart illustrating a method for determining a driving mode of a vehicle according to another form of the present disclosure.

As shown in FIG. 7, the controller 140 determines the safety driving mode area based on the driving information, the driver information, and the surrounding environment information about the vehicle acquired from the detector 120 (S310).

When the vehicle is determined to be located in the building or at the parking lot based on the vehicle surrounding environment information acquired from the detector 120 in S310, the controller 140 may determine that the vehicle is located in the safety driving mode area.

When the at least one of the children protection zone, the senior protection zone, or the speed-bump zone is located in the predetermined range around the vehicle based on the vehicle surrounding environment information in S310, the controller 140 may determine that the vehicle is located in the safety driving mode area.

When the vehicle is located on the two lane road except for the expressway, the local road, and the driveway based on the vehicle surrounding environment information about the vehicle in S310, the controller 140 may determine that the vehicle is located in the safety driving mode area.

When the vehicle is located in the expressway service area, the rest area, the road without the lane/signal information, the residential area road, the controller 140 may determine that the vehicle is located in the safety driving mode area.

When it is determined that the vehicle is located in the safety driving mode area (Y) in S310, the controller 140 may activate the safety driving mode (S340).

When it is determined that the vehicle is not located in the safety driving mode area (N) in S310, the controller 140 determines whether a vehicle in front of or rear the vehicle is in the congested state (S320).

When it is determined that a vehicle in front of or rear the vehicle is in the congested state, the controller 140 may activate the safety driving mode (S340).

When the vehicle is not located in the safety driving mode area in S310, and a vehicle in front of or rear the vehicle is not in the congested state in S320, the controller 140 may activate the normal driving mode (S330).

Figure 8:
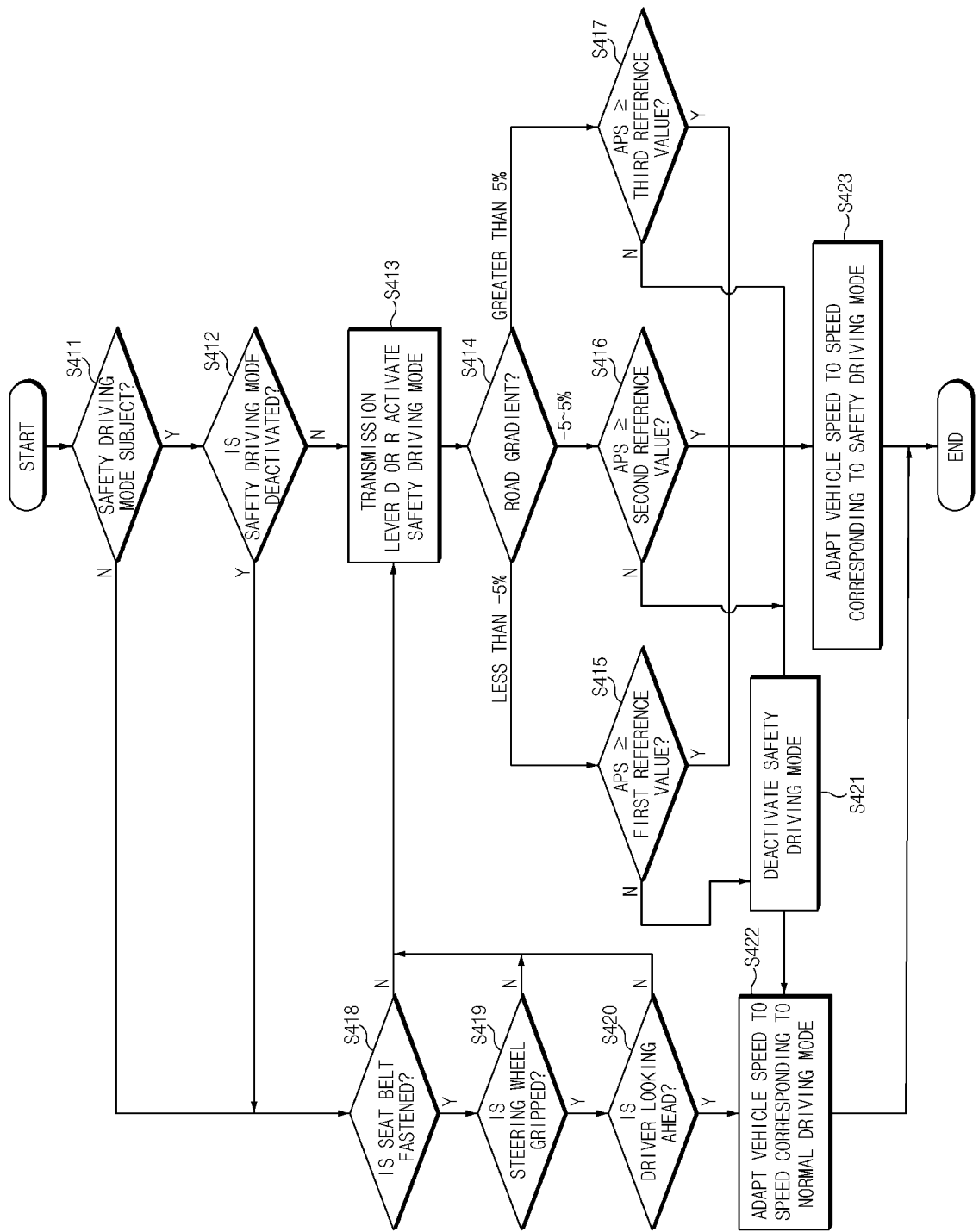
FIG. 8 is a flowchart illustrating a method for controlling driving of a vehicle during stopping.

FIG. 8 is a flowchart illustrating a method for controlling driving of a vehicle during stopping according to other form of the present disclosure.

When the transmission lever of the vehicle is 'P' or 'N', and the vehicle speed is '0', the controller 140 may determine that the vehicle is in the stopped or parked state.

The controller 140 determines whether the driver is the safety driving mode subject while the vehicle is in the parked or stopped state (S411).

When it is determined that the driver is the safety driving mode subject (Y) in S411, the controller 140 determines whether the safety driving mode is deactivated based on the input signal output from the input device (S412).

When the safety driving mode is not deactivated (N) in S412, the controller 140 determines whether the transmission lever of the vehicle is changed to 'D' or 'R'. When the transmission lever of the vehicle is changed, the controller 140 activates the safety driving mode (S413).

The controller 140 determines the road gradient (S414).

The controller 140 may determine the road gradient in S414 by dividing into a case of the road having the downward gradient (e.g.: a road gradient less than −5%), a case of the road having one of the downward, the flat, and the upward gradients (e.g.: a road gradient of −5% to 5%), and a case of the road having the upward gradient (e.g.: a road gradient greater than 5%).

The controller 140 determines whether the sensed value from the accelerator pedal sensor on the road having the downward gradient at S414 is equal to or greater than the first reference value (S415).

The controller 140 determines whether the sensed value from the accelerator pedal sensor on the road having one of the downward, the flat, and the upward gradients at S414 is equal to or greater than the second reference value that is higher than the first reference value (S416).

The controller 140 determines whether the sensed value from the accelerator pedal sensor on the road having the upward gradient at S414 is equal to or greater than the third reference value that is higher than the second reference value (S417).

When the sensed value from the accelerator pedal sensor is equal to or greater than the first reference value (Y) in S415, when the sensed value from the accelerator pedal sensor is equal to or greater than the second reference value, which is higher than the first reference value (Y) in S416, or when the sensed value from the accelerator pedal sensor is equal to or greater than the third reference value, which is higher than the second reference value (Y) in S417, the controller 140 may determine that the vehicle is in the acceleration state (rapid acceleration state), maintain the safety driving mode, and adapt the vehicle speed to the speed corresponding to the safety driving mode (S423).

In S423, the controller 140 sets the gear level to the lowest level (e.g., gear level 1), and controls the engine RPM to maintain equal to or lower than the reference RPM, thereby setting the speed corresponding to the safety driving mode, and controlling the display 130 to display that the vehicle speed is being adapted to the speed corresponding to the safety driving mode.

Further, when the sensed value from the accelerator pedal sensor is lower than the first reference value (N) in S415, when the sensed value from the accelerator pedal sensor is lower than the second reference value, which is higher than the first reference value (N) in S416, or when the sensed value from the accelerator pedal sensor is lower than the third reference value, which is higher than the second reference value (N) in S417, the controller 140 may determine that the vehicle is not in the acceleration state (rapid acceleration state).

When it is determined that the vehicle is not in the acceleration state (rapid acceleration state), the controller 140 deactivates the safety driving mode (S421), and activates the normal driving mode, and then adapts the vehicle speed to the speed corresponding to the normal driving mode (S422).

When it is determined that the driver is not the safety driving mode subject (N) in S411, or that the safety driving mode is deactivated (Y) in S412, the controller 140 determines whether the seat belt is fastened (S418).

When it is determined that the driver is wearing the seat belt (Y) in S418, the controller 140 determines whether the steering wheel is gripped (S419).

When it is determined that the driver's hand is gripping the steering wheel (Y) in S419, the controller determines whether the driver is looking ahead (S420).

When it is determined that the driver is looking ahead (Y) in S420, the controller 140 activates the normal driving mode, and adapts the vehicle speed to the speed corresponding to the normal driving mode (S422).

When the seat belt is not fastened (N) in S418, when the driver's hand is not gripping the steering wheel (N) in S419, or when the driver is not looking ahead (N) in S420, the controller 140 may reactivate the safe driving mode (S413).

When the seat belt is fastened (Y) in S418, when the driver's hand is gripping the steering wheel (Y) in S419, and when the driver is looking ahead (Y) in S420, the controller 140 may adapt the vehicle speed to the speed corresponding to the normal driving mode (S422).

Figure 9:
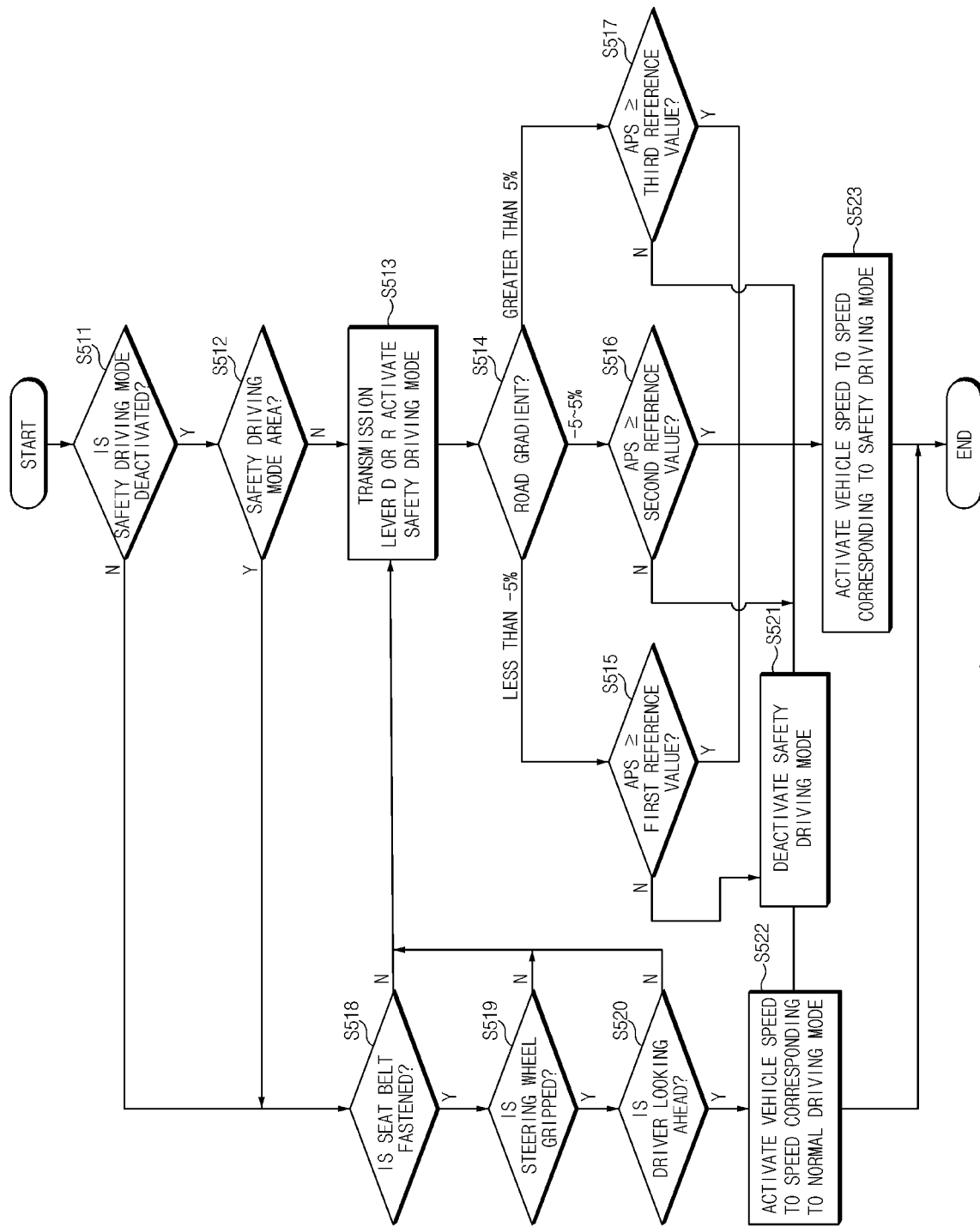
FIG. 9 is a flowchart illustrating a method for controlling driving of a vehicle during driving.

FIG. 9 is a flowchart illustrating a method for controlling driving of a vehicle during driving according to another form of the present disclosure.

When the transmission lever of the vehicle is 'D' or 'R', and the vehicle speed is not '0', the controller 140 may determine that the vehicle is in the driving state.

The controller 140 determines whether the safety driving mode is deactivated (S511).

When the safety driving mode is not deactivated (N) in S511, the controller 140 determines whether the vehicle is located in the safety driving mode area (S512).

When it is determined that the vehicle is located in the safety driving mode area in S512, the controller 140 determines whether the transmission lever of the vehicle is 'D' or 'R', and activates the safety driving mode (S513).

The controller 140 determines the road gradient (S514).

The controller 140 may determine the road gradient in S514 by dividing into a case of the road having the downward gradient (e.g.: a road gradient less than −5%), a case of the road having one of the downward, the flat, and the upward gradients (e.g.: a road gradient of −5% to 5%), and a case of the road having the upward gradient (e.g.: a road gradient of greater than 5%).

The controller 140 determines whether the sensed value from the accelerator pedal sensor on the road having the downward gradient at S514 is equal to or greater than the first reference value (S515).

The controller 140 determines whether the sensed value from the accelerator pedal sensor on the road having one of the downward, the flat, and the upward gradients at S514 is equal to or greater than the second reference value that is higher than the first reference value (S516).

The controller 140 determines whether the sensed value from the accelerator pedal sensor on the road having the upward gradient at S514 is equal to or greater than the third reference value that is higher than the second reference value (S517).

When the sensed value from the accelerator pedal sensor is equal to or greater than the first reference value (Y) in S515, when the sensed value from the accelerator pedal sensor is equal to or greater than the second reference value, which is higher than the first reference value (Y) in S516, or when the sensed value from the accelerator pedal sensor is equal to or greater than the third reference value, which is higher than the second reference value (Y) in S517, the controller 140 may determine that the vehicle is in the acceleration state (rapid acceleration state). When it is determined that the vehicle is in the acceleration state (rapid acceleration state), the controller 140 maintains the safety driving mode, and adapts the vehicle speed to the speed corresponding to the safety driving mode (S523).

In S523, the controller 140 sets the gear level to the gear level of the driving state, and cuts the fuel supply to the engine, thereby setting the speed corresponding to the safety driving mode, and controlling the display 130 to display that the vehicle speed is being adapted to the speed corresponding to the safety driving mode.

Further, when the sensed value from the accelerator pedal sensor is lower than the first reference value (N) in S515, when the sensed value from the accelerator pedal sensor is lower than the second reference value, which is higher than the first reference value (N) in S516, or when the sensed value from the accelerator pedal sensor is lower than the third reference value, which is higher than the second reference value (N) in S517, the controller 140 may determine that the vehicle is not in the acceleration state (rapid acceleration state).

When it is determined that the vehicle is not in the acceleration state (rapid acceleration state), the controller 140 deactivates the safety driving mode (S521), activates the normal driving mode, and then adapts the vehicle speed to the speed corresponding to the normal driving mode (S522).

When it is determined that the safety driving mode is deactivated (Y) in S511 or that the vehicle is not located in the safety driving mode area (N) in S512, the controller 140 determines whether the seat belt is fastened (S518).

When it is determined that the driver wears the seat belt (Y) in S518, the controller 140 determines whether the steering wheel is gripped (S519).

When it is determined that the driver's hand is gripping the steering wheel (Y) in S519, the controller 140 determines whether the driver is looking ahead (S520).

When it is determined that the driver is looking ahead (Y) in S520, the controller 140 activates the normal driving mode, and adapts the vehicle speed to the speed corresponding to the normal driving mode (S522).

When the seat belt is not fastened (N) in S518, when the driver's hand is not gripping the steering wheel (N) in S519, or when the driver is not looking ahead (N) in S520, the controller 140 may activate the safety driving mode (S513).

When the seat belt is fastened (Y) in S518, when the driver's hand is gripping the steering wheel (Y) in S519, and when the driver is looking ahead (Y) in S520, the controller 140 may adapt the vehicle speed to the speed corresponding to the normal driving mode (S522).

Figure 10:
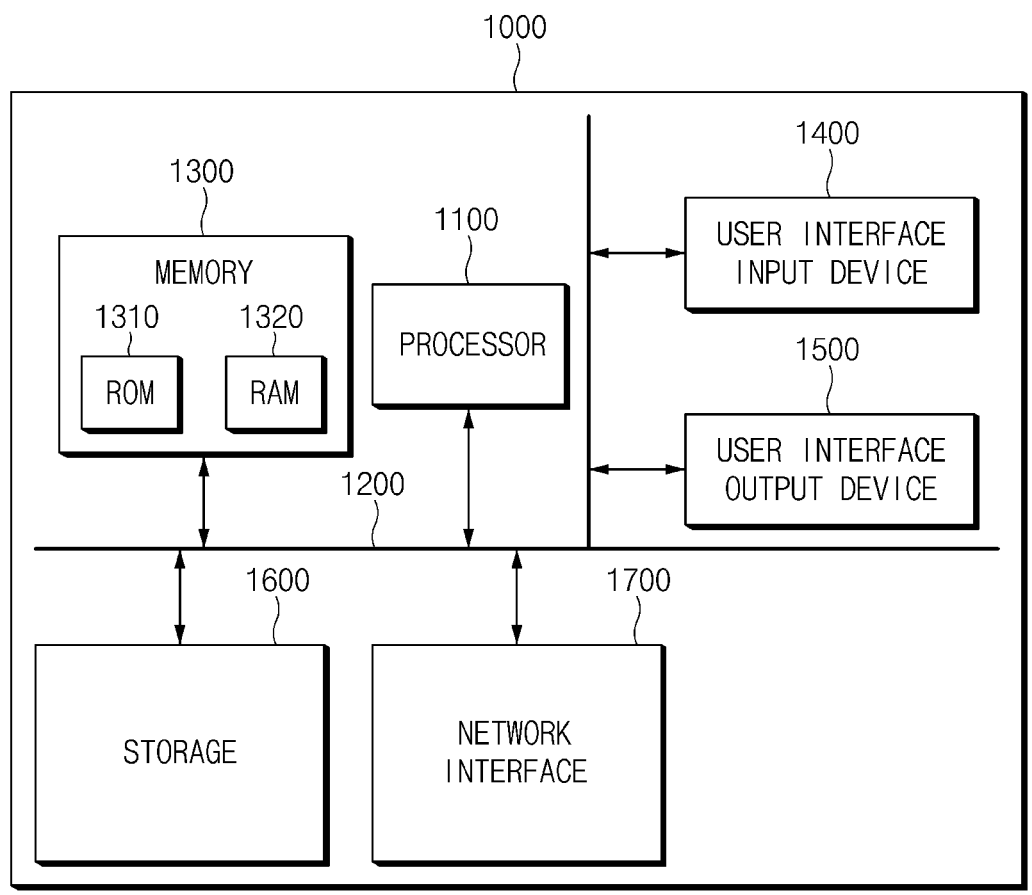
FIG. 10 illustrates a computing system.

FIG. 10 illustrates a computing system according to one form of the present disclosure.

Referring to FIG. 10, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the exemplary forms disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal.

In another case, the processor 1100 and the storage medium may reside in the user terminal as separate components.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

The device and the method for controlling driving of the vehicle according to one form of the present disclosure may support the safety driving of the vehicle by restricting the speed of the vehicle even when the driver incorrectly puts the accelerator pedal in place of the brake pedal.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A device for controlling driving of a vehicle, the device comprising:
   at least one or more sensors configured to acquire driving information, driver information, and surrounding environment information about the vehicle; and
   a controller configured to:
      determine whether to activate a safety driving mode based on at least one of the driving information, the driver information, or the surrounding environment information about the vehicle; and
      determine whether to maintain the safety driving mode based on a state of the vehicle after activating the safety driving mode,
      wherein when the state of the vehicle is determined as a rapid acceleration state, the controller is configured to maintain the safety driving mode and configured to adapt a speed of the vehicle to a speed corresponding to the safety driving mode.

2. The device of claim 1, wherein the controller is configured to determine whether the vehicle is in the rapid acceleration state based on a sensed value from an accelerator pedal sensor associated with a gradient of a road on which the vehicle travels.

3. The device of claim 2, wherein when the sensed value is indicative of a downward gradient and equal to or greater than a first reference value, the controller is configured to determine that the vehicle is in the rapid acceleration state.

4. The device of claim 2, wherein when the sensed value from the accelerator pedal is indicative of a downward gradient, a flat gradient, or an upward gradient, and is equal to or greater than a second reference value higher than the first reference value, the controller is configured to determine that the vehicle is in the rapid acceleration state.

5. The device of claim 2, wherein when the sensed value from the accelerator pedal sensor is indicative of an upward gradient and equal to or greater than a third reference value, the controller is configured to determine that the vehicle is in the rapid acceleration state.

6. The device of claim 1, wherein the safety driving mode includes a driving mode in which, when the vehicle is determined to be in the rapid acceleration state while being in a parked state or a stopped state, a gear level of the vehicle is set to a lowest level and a revolutions per minute (RPM) of an engine of the vehicle is maintained to be equal to or lower than a reference RPM.

7. The device of claim 1, wherein the safety driving mode includes a driving mode in which, when the vehicle is determined to be in the rapid acceleration state while being in a driving state, a gear level of the vehicle is set to a gear level corresponding to the driving state, and a fuel supply to an engine of the vehicle is cut.

8. The device of claim 1, wherein the controller is configured to determine a safety driving mode subject or a safety driving mode area based on at least one of the driving information, the driver information, or the surrounding environment information about the vehicle, and
   wherein the controller is configured to determine whether to activate the safety driving mode based on whether a driver of the vehicle is the safety driving mode subject or whether a current location of the vehicle is in the safety driving mode area.

9. The device of claim 8, wherein when the driver is not the safety driving mode subject, or when the current location of the vehicle is not in the safety driving mode area, the controller is configured to adapt a speed of the vehicle to a speed corresponding to a normal driving mode.

10. A method for controlling driving of a vehicle, the method comprising:
    acquiring, by at least one or more sensors, driving information, driver information, and surrounding environment information about the vehicle;
    determining, by a controller, whether to activate a safety driving mode based on at least one of the driving information, the driver information, or the surrounding environment information about the vehicle; and
    determining, by the controller, whether to maintain the safety driving mode based on a state of the vehicle after activating the safety driving mode,
    maintaining, by the controller, the safety driving mode and adapting a speed of the vehicle to a speed corresponding to the safety driving mode when the state of the vehicle is determined to be in a rapid acceleration state.

11. The method of claim 10, further comprising: determining, by the controller, whether the vehicle is in the rapid acceleration state based on a sensed value from an accelerator pedal sensor associated with a gradient of a road on which the vehicle is traveling.

12. The method of claim 11, further comprising: determining by the controller that the vehicle is in the rapid acceleration state when the road has a downward gradient and the sensed value from the accelerator pedal sensor is equal to or greater than a first reference value.

13. The method of claim 11, further comprising: determining by the controller that the vehicle is in the rapid acceleration state when the road has a downward gradient, a flat gradient, or an upward gradient and the sensed value from the accelerator pedal sensor is equal to or greater than a second reference value higher than the first reference value.

14. The method of claim 11, further comprising: determining by the controller that the vehicle is in the rapid acceleration state when the road has an upward gradient and the sensed value from the accelerator pedal sensor is equal to or greater than a third reference value.

15. The method of claim 10, wherein the safety driving mode includes a driving mode in which, when the vehicle is determined to be in the rapid acceleration state while being in a parked state or a stopped state, a gear level of the vehicle is set to a lowest level and a revolutions per minute (RPM) of an engine of the vehicle is maintained to be equal to or lower than a reference RPM.

16. The method of claim 10, wherein the safety driving mode includes a driving mode in which, when the vehicle is determined to be in the rapid acceleration state while being in a driving state, a gear level of the vehicle is set to a gear level corresponding to the driving state, and a fuel supply to an engine of the vehicle is cut.

17. The method of claim 10, further comprising:
- determining, by the controller, a safety driving mode subject or a safety driving mode area based on at least one of the driving information, the driver information, or the surrounding environment information about the vehicle; and
- determining, by the controller, whether to activate the safety driving mode based on whether a driver of the vehicle is the safety driving mode subject or whether a current location of the vehicle is in the safety driving mode area.

18. The method of claim 17, further comprising: adapting, by the controller, a vehicle speed to a speed corresponding to a normal driving mode when the driver is not the safety driving mode subject, or when the current location of the vehicle is not in the safety driving mode area.

\* \* \* \* \*